United States Patent
Wanami et al.

(10) Patent No.: US 7,380,437 B2
(45) Date of Patent: Jun. 3, 2008

(54) COLLISION SENSING DEVICE FOR A VEHICLE

(75) Inventors: Shingo Wanami, Kariya (JP); Toshihito Nonaka, Chiryu (JP)

(73) Assignee: Denso Corporation, Kariya (JP)

(*) Notice: Subject to any disclaimer, the term of this patent is extended or adjusted under 35 U.S.C. 154(b) by 101 days.

(21) Appl. No.: 11/410,843

(22) Filed: Apr. 25, 2006

(65) Prior Publication Data

US 2006/0236749 A1   Oct. 26, 2006

(30) Foreign Application Priority Data

Apr. 26, 2005   (JP) .............................. 2005-128343

(51) Int. Cl.
*G01M 7/00*   (2006.01)
(52) U.S. Cl. .................... 73/12.09; 73/12.04; 73/12.08
(58) Field of Classification Search ..... 73/12.01–12.14
See application file for complete search history.

(56) References Cited

U.S. PATENT DOCUMENTS

| | | | | |
|---|---|---|---|---|
| 3,901,346 | A | * | 8/1975 | Kohls et al. ................. 180/277 |
| 5,318,145 | A | * | 6/1994 | Vollmer ....................... 180/274 |
| 5,408,214 | A | * | 4/1995 | Chalmers et al. ........... 340/436 |
| 5,748,075 | A | | 5/1998 | Dirmeyer et al. |
| 5,974,892 | A | | 11/1999 | Swart et al. |
| 6,393,892 | B1 | * | 5/2002 | Ohbayashi et al. ........ 73/12.01 |
| 7,231,803 | B2 | * | 6/2007 | Stuetzler .................... 73/12.01 |
| 2006/0111862 | A1 | | 5/2006 | Otterbach et al. |

FOREIGN PATENT DOCUMENTS

| | | |
|---|---|---|
| DE | 196 19 468 | 8/1997 |
| DE | 198 50 851 | 4/2000 |
| DE | 10 2004 008 616 | 9/2005 |
| JP | 02-249740 | 10/1990 |
| WO | WO 2005/044634 | 5/2005 |

OTHER PUBLICATIONS

U.S. Appl. No. 11/410,842, filed Apr. 25, 2006, Wanami et al.
Office Action dated Feb. 5, 2007 in German Application No. 10 2006 018 553.6 with English translation.
Office Action dated Feb. 12, 2007 in German Application No. 10 2006 018 547.1 with English translation.

* cited by examiner

*Primary Examiner*—Max Noori
(74) *Attorney, Agent, or Firm*—Harness, Dickey & Pierce, PLC

(57) ABSTRACT

In a vehicle collision sensing system, a relative pressure sensor senses a pressure difference between a pressure at an inside of a door interior space and a pressure at an outside of the door interior space. An air bag ECU determines the collision of the vehicle based on the pressure difference, which is sensed by the relative pressure sensor.

12 Claims, 6 Drawing Sheets

COLLISION SENSING DEVICE FOR A VEHICLE

CROSS REFERENCE TO RELATED APPLICATION

This application is based on and incorporates herein by reference Japanese Patent Application No. 2005-128343 filed on Apr. 26, 2005. This application is also related to U.S. application Ser. No. 11/410,842, entitled "VEHICLE COLLISION SENSING SYSTEM," filed on Apr. 25, 2006.

BACKGROUND OF THE INVENTION

1. Field of the Invention

The present invention relates to a vehicle collision sensing system, which senses, for example, a pressure in an interior space of a door of a vehicle and determines collision of the vehicle based on the sensed pressure.

2. Description of Related Art

One previously proposed way of activating an occupant protective device is use of a pressure sensor, which serves as a collision sensing means for sensing a collision of the vehicle (see, for example, Japanese Unexamined Patent Publication No. H02-249740). For example, Japanese Unexamined Patent Publication No. H02-249740 recites a system that includes an airtight air tank, which is arranged in an interior space of a door of a vehicle, and a pressure sensor, which senses a pressure in the air tank. In this system, when the pressure in the air tank sensed by the pressure sensor becomes equal to or greater than a predetermined threshold value, it is determined that a collision of the vehicle has occurred, and a protective device, such as an air bag, is activated.

However, a receiving space for receiving the air tank in the interior space of the vehicle door needs to be provided. Therefore, the limitations on the designing of the vehicle door and the air tank are increased. Furthermore, the provision of the air tank leads to an increase in the manufacturing costs. In view of this, it is conceivable to eliminate the air tank and directly measure the pressure in the interior space of the vehicle door with the pressure sensor to sense the collision of the vehicle. That is, the collision may be determined by comparing the pressure in the interior space of the door of the vehicle door with the predetermined threshold value.

However, the pressure in the interior space of the vehicle door substantially changes when the atmospheric pressure substantially changes due to a substantial change in an altitude and/or weather of a current location of the vehicle. When the collision of the vehicle is determined by comparing the pressure in the interior space of the vehicle door with the predetermined threshold value, there is a possibility that the collision of the vehicle cannot be reliably sensed. This is also true in the case where the air tank is provided in the vehicle door.

SUMMARY OF THE INVENTION

The present invention is made in view of the above disadvantages. Thus, it is an objective of the present invention to provide a vehicle collision sensing system, which enables more reliable sensing of a collision of a vehicle regardless of a change in the atmospheric pressure caused by a change in an altitude and/or weather of a current location of the vehicle.

To achieve the objective of the present invention, there is provided a vehicle collision sensing system for sensing a collision of a vehicle. The vehicle collision sensing system includes a vehicle body member, a relative pressure sensing means and a collision determining means. The vehicle body member forms a predetermined space therein. The predetermined space is deformable by the collision of the vehicle. The relative pressure sensing means is for sensing a pressure difference between a pressure at an inside of the predetermined space and a pressure at an outside of the predetermined space. The collision determining means is for determining the collision of the vehicle based on the pressure difference, which is sensed by the relative pressure sensing means.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Next, various embodiments of the present invention will be described.

First Embodiment

Figure 1:
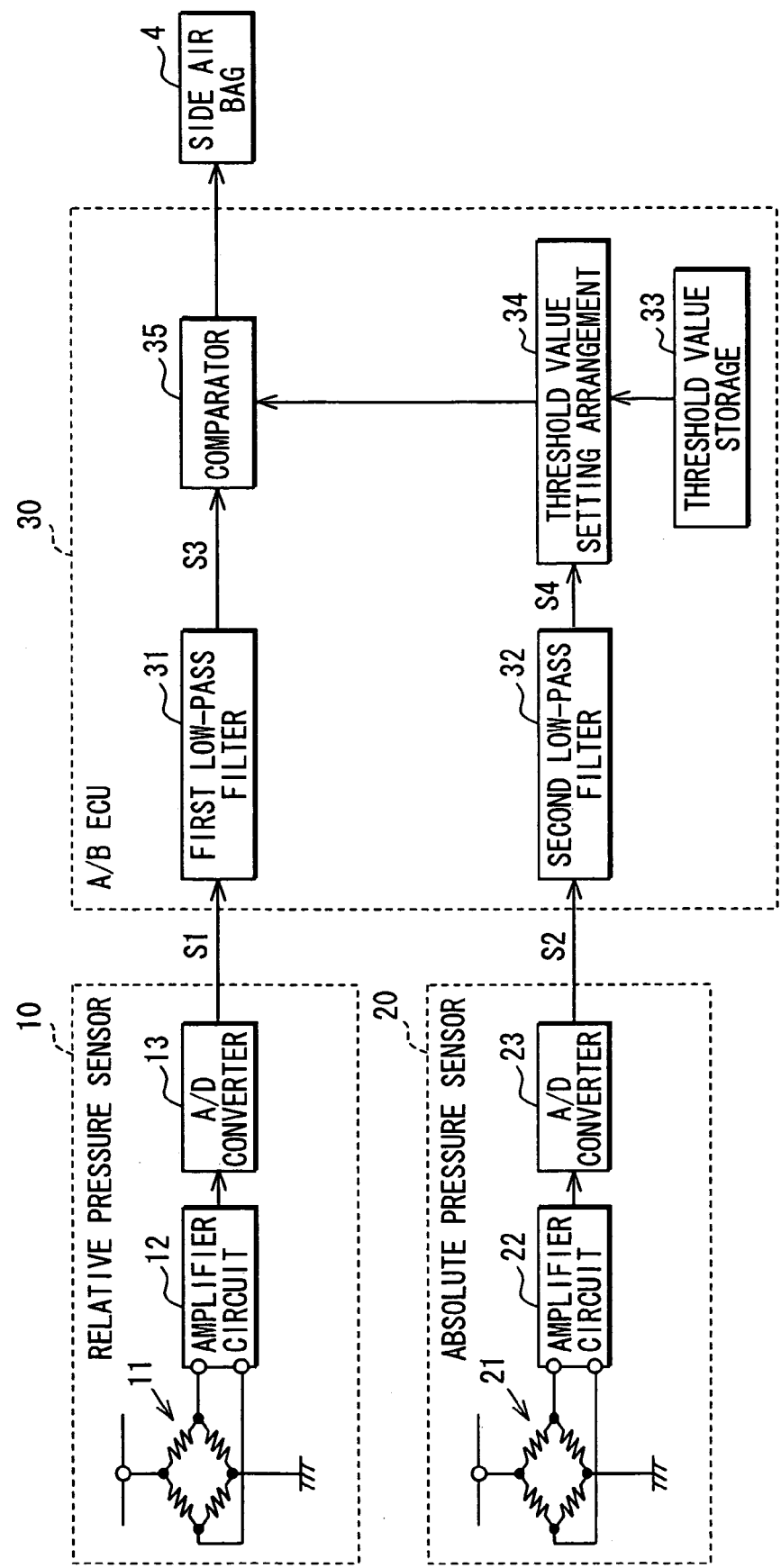
FIG. 1 is a block diagram showing a vehicle collision sensing system of a first embodiment.
Figure 2:
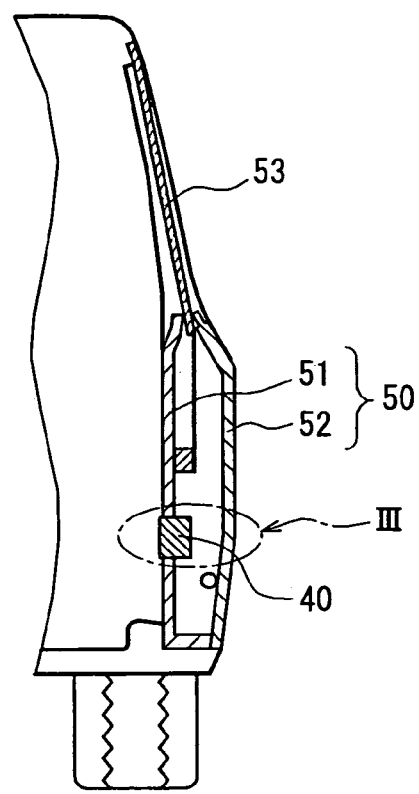
FIG. 2 is a cross sectional view of a vehicle door.
Figure 3:
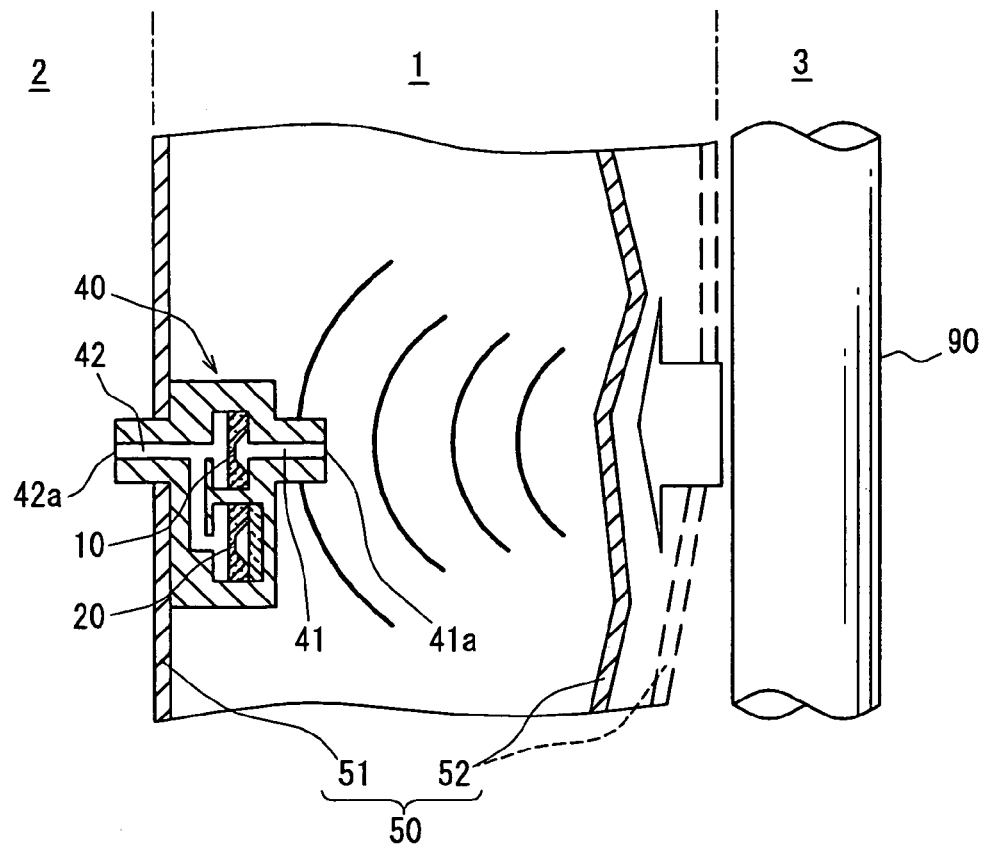
FIG. 3 is an enlarged view of a circled portion III in FIG. 2.
Figure 4:
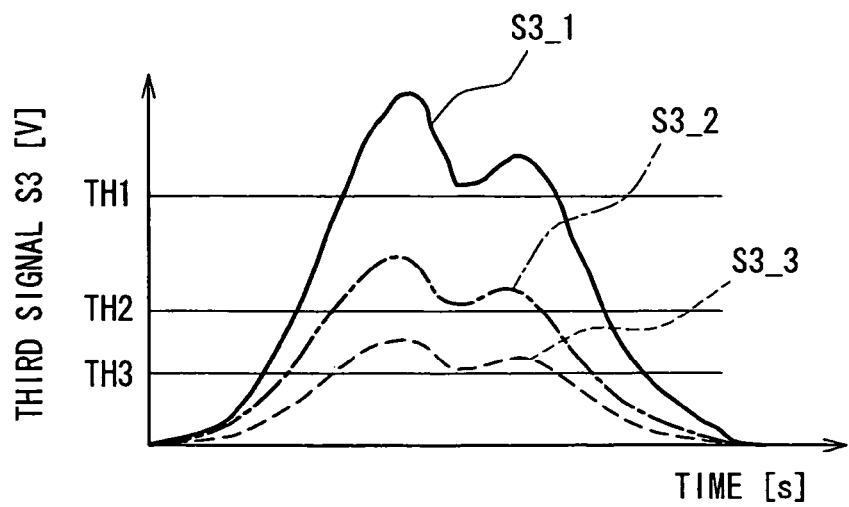
FIG. 4 is a diagram for describing collision determination of the vehicle in a comparator of an air bag ECU and indicating a third signal relative to an elapsed time since collision of the vehicle.

A vehicle collision sensing system according to a first embodiment of the present invention will be described with reference to FIGS. 1 to 4. FIG. 1 is a block diagram showing the vehicle collision sensing system of the first embodiment. FIG. 2 is a cross sectional view of a vehicle door. FIG. 3 is an enlarged view of a circled portion III in FIG. 2. FIG. 4 is a diagram for describing collision determination of the vehicle, which is carried out by a comparator 35 of an air bag ECU 30.

As shown in FIG. 1, the vehicle collision sensing system of the first embodiment includes a relative pressure sensor 10, an absolute pressure sensor 20 and the air bag ECU (hereinafter, referred to as an A/B ECU) 30.

The relative pressure sensor (a relative pressure sensing means) 10 is a sensor that senses a pressure difference between an absolute pressure in a door interior space 1 and an absolute pressure in a passenger compartment 2. In other words, the relative pressure sensor 10 senses a pressure difference between an absolute pressure at an inside of the door interior space 1 and an absolute pressure at an outside of the door interior space 1. The absolute pressure sensor (an absolute pressure sensing means) 20 is a sensor that senses the absolute pressure in the passenger compartment 2. Positions of the relative pressure sensor 10 and of the absolute pressure sensor 20 will be described with reference to FIGS. 2 and 3. The relative pressure sensor 10 and the absolute pressure sensor 20 are formed integrally, as shown in FIG. 3. The structure, which includes the integrated relative pressure sensor 10 and absolute pressure sensor 20, will be hereinafter referred to as an integral sensor module 40. The integral sensor module 40 is mostly placed in the door interior space 1, which is formed in an interior of the vehicle door (one example of a vehicle body member of the present invention) 50, as shown in FIGS. 2 and 3. Specifically, the integral sensor module 40 is mostly arranged in the door interior space 1, which is formed between an inner panel 51 and an outer panel 52 that constitute the vehicle door 50. Further specifically, the integral sensor module 40 is installed to an outer panel 52 side surface of the inner panel 51.

As shown in FIG. 3, the integral sensor module 40 receives the relative pressure sensor 10 and the absolute pressure sensor 20, and two sensing holes, i.e., first and second sensing holes 41, 42 are formed in the integral sensor module 40. The first sensing hole 41 communicates between one side surface (a right side surface in FIG. 3) of the relative pressure sensor 10 and a door interior side sensing opening 41a, which opens in the door interior space 1. That is, the right side surface of the relative pressure sensor 10 of FIG. 3 receives the absolute pressure of the door interior space 1 from the door interior side sensing opening 41a through the first sensing hole 41. The second sensing hole 42 communicates between the other side surface (a left side surface in FIG. 3) of the relative pressure sensor 10 and a passenger compartment side sensing opening 42a, which opens in the passenger compartment 2. That is, the left side surface of the relative pressure sensor 10 of FIG. 3 receives the absolute pressure of the passenger compartment 2 from the passenger compartment side sensing opening 42a through the second sensing hole 42. The second sensing hole 42 has a branch that is communicated with the absolute pressure sensor 20. That is, the absolute pressure sensor 20 receives the absolute pressure of the passenger compartment 2 from the passenger compartment side sensing opening 42a through the second sensing hole 42.

The inner panel 51 is a panel that partitions between the door interior space 1 and the vehicle passenger compartment 2. The outer panel 52 is a panel that partitions between the door interior space 1 and a space at an outside 3 of the vehicle. For example, when a side collision impact is laterally applied in a direction of an arrow in FIG. 3 from an external obstacle (e.g., a utility pole) 90 located at the outside 3 of the vehicle to the outer panel 52, the outer panel 52 is deformed (see a change from a dotted line before the collision to a solid line after the collision in FIG. 3). Due to the deformation of the outer panel 52 caused by the application of the side collision impact, the door interior space 1 is also deformed.

Now, the description is made with reference to FIG. 1. As shown in FIG. 1, the relative pressure sensor 10, which is arranged in the manner described above, includes a relative pressure sensor chip (a sensing circuit) 11, an amplifier circuit 12 and an A/D converter 13. The relative pressure sensor chip 11 includes diffused resistors, which form a Wheatstone bridge on a diaphragm that is produced by thinly processing a center portion of a silicon chip. When the pressure is applied to the relative pressure sensor chip 11 to cause deformation of the diaphragm, an electric potential difference between a left end and a right end of the relative pressure sensor chip 11 in FIG. 1 changes. Then, the relative pressure sensor chip 11 outputs a signal (a pressure difference indicative signal), which indicates the electric potential difference between the left end and the right end of the pressure sensor chip 11 in FIG. 1. One surface side of the diaphragm of the relative pressure sensor chip 11 is communicated with the door interior space 1, and the other surface side of the diaphragm is communicated with the passenger compartment 2. That is, the diaphragm of the relative pressure sensor chip 11 is deformed in response to a pressure difference between the absolute pressure of the door interior space 1 supplied from the door interior side sensing opening 41a and the absolute pressure of the passenger compartment 2 supplied from the passenger compartment side sensing opening 42a. In other words, the electric potential difference between the left end and the right end of the relative pressure sensor chip 11 in FIG. 1 corresponds to the pressure difference between the absolute pressure of the door interior space 1 and the absolute pressure of the passenger compartment 2.

The amplifier circuit 12 amplifies the signal, which is outputted from the relative pressure sensor chip 11 and indicates the electric potential difference. Then, the signal, which is amplified by the amplifier circuit 12, undergoes analog to digital conversion through the A/D converter 13. Thereafter, the A/D converter 13 outputs a signal (a first signal) S1, which is A/D converted, to the A/B ECU 30.

The absolute pressure sensor 20 includes an absolute pressure sensor chip 21, an amplifier circuit 22 and an A/D converter 23. Similar to the relative pressure sensor chip 11, the absolute pressure sensor chip 21 includes diffused resistors, which form a Wheatstone bridge on a diaphragm that is produced by thinly processing a center portion of a silicon chip. When the pressure is applied to the absolute pressure sensor chip 21 to cause deformation of the diaphragm, an electric potential difference between a left end and a right end of the absolute pressure sensor chip 21 in FIG. 1 changes. Then, the absolute pressure sensor chip 21 outputs a signal (an absolute pressure indicative signal), which indicates the electric potential difference between the left end and the right end of the absolute pressure sensor chip 21 in FIG. 1. Here, the one side of the diaphragm of the absolute pressure sensor chip 21 is communicated with the passenger compartment 2, and the other side of the diaphragm of the absolute pressure sensor chip 21 forms a vacuum space between the other side of the diaphragm and a glass pedestal. That is, the diaphragm of the absolute pressure sensor chip 21 is deformed in response to the absolute pressure of the passenger compartment 2 supplied from the passenger compartment side sensing opening 42a. In other words, the electric potential difference between the left end and the right end of the absolute pressure sensor chip 21 in FIG. 1 corresponds to the absolute pressure of the passenger compartment 2.

The amplifier circuit 22 amplifies the signal of the absolute pressure, which is outputted from the absolute pressure sensor chip 21. Then, the signal, which is amplified by the amplifier circuit 22, undergoes analog to digital conversion through the A/D converter 23. Thereafter, the A/D converter 23 outputs a signal (a second signal) S2, which is A/D converted, to the A/B ECU 30.

The A/B ECU 30 determines whether a side air bag 4 should be deployed based on the signals S1, S2 supplied from the relative pressure sensor 10 and the absolute pressure sensor 20. The A/B ECU 30 includes a first low-pass filter 31, a second low-pass filter 32, a threshold value storage 33, a threshold value setting arrangement 34 and a comparator 35.

The first low-pass filter 31 performs low-pass filtering on the first signal S1, which is supplied from the relative pressure sensor 10, at a first cutoff frequency, so that a third signal (a first filtered signal) S3 is generated. Here, the first cutoff frequency is set to be higher than the frequency of the pressure difference between the door interior space 1 and the passenger compartment 2 at the time of the vehicle collision. Furthermore, the first cutoff frequency is set to be lower than the frequency of the high frequency noises to remove the high frequency noises.

The second low-pass filter 32 performs low-pass filtering on the second signal S2, which is supplied from the absolute pressure sensor 20, at a second cutoff frequency, so that a fourth signal (a second filtered signal) S4 is generated. Here, the second cutoff frequency is set to be lower than the frequency of the high frequency noises to remove the high frequency noises. The absolute pressure, which is sensed by the absolute pressure sensor 20, is the absolute pressure of the passenger compartment 2. Therefore, the vehicle collision does not cause a substantially change in the sensed absolute pressure of the absolute pressure sensor 20.

The threshold value storage 33 stores a plurality of threshold values TH, which are used to determine the collision of the vehicle. A corresponding one of the threshold values TH serves as a reference value that is compared with the third signal S3, which is generated by the first low-pass filter 31, to determine the collision of the vehicle. The threshold value storage 33 stores a threshold value map, which includes the threshold values TH that are correlated to the fourth signal S4, which is generated by the second low-pass filter 32. Specifically, a full possible voltage range of the fourth signal S4 (the full possible voltage range of the fourth signal S4 corresponding to a possible absolute pressure range) is divided into a plurality of voltage sub-ranges. Each of the voltage sub-ranges is associated with a corresponding one of the threshold values TH. For example, one of the threshold values TH, which is associated with the voltage sub-range P1 to P2 of the fourth signal S4, is set to be TH1, and a next one of the threshold values TH, which is associated with the voltage sub-range P2 to P3 of the fourth signal S4 is set to be TH2, and a next one of the threshold values TH, which is associated with the voltage sub-range P3 to P4 of the fourth signal is set to be TH3.

The threshold value setting arrangement (a collision determining means) 34 modifies and sets the threshold value TH used in the collision determination of the vehicle based on the fourth signal S4 generated by the second low-pass filter 32 and the threshold value map stored in the threshold value storage 33. Specifically, the threshold value setting arrangement 34 selects the corresponding threshold value TH, which corresponds to the voltage range that covers the fourth signal S4, from the threshold value map and modifies and sets it as the threshold value TH used in the collision determination of the vehicle.

The comparator (the collision determining means) 35 compares the third signal S3 generated by the first low-pass filter 31 with the threshold value TH set by the threshold value setting arrangement 34. When it is determined that the third signal S3 exceeds the threshold value TH, the comparator 35 determines that a collision of the vehicle has occurred. When it is determined that the collision of the vehicle has occurred, the comparator 35 outputs a signal for deploying the side air bag 4.

The collision determination of the vehicle in the comparator 35 will be described in detail with reference to FIG. 4. FIG. 4 is a diagram showing the voltage value of the third signal S3 (corresponding to the pressure difference between the absolute pressure of the door interior space 1 and the absolute pressure of the passenger compartment 2) relative to the elapsed time since the collision of the vehicle. In FIG. 4, a solid line S3_1, a dot-dash line S3_2 and a dotted line S3_3 indicate a change in the third signal S3 for three different atmospheric pressures, respectively, at the time of applying the same impact to the vehicle. Specifically, the solid line S3_1 indicates a state under a high atmospheric pressure. The dotted line S3_3 indicates a state under a low atmospheric pressure. The dot-dash line S3_2 indicates a state under an intermediate atmospheric pressure, which is intermediate between the high atmospheric pressure and the low atmospheric pressure.

Now, the reasons why the third signal S3 is changed in the manner shown in FIG. 4 will be described. The third signal S3 is the signal that corresponds to the pressure difference between the absolute pressure of the door interior space 1 and the absolute pressure of the passenger compartment 2 sensed by the relative pressure sensor 10. The pressure difference between the absolute pressure of the door interior space 1 and the absolute pressure of the passenger compartment 2 sensed by the relative pressure sensor 10 is substantially zero until just before the collision of the vehicle. Therefore, the third signal S3 is substantially zero until just before the collision of the vehicle. As a result, in FIG. 4, at the time of occurrence of the collision of the vehicle (time zero), the solid line S3_1, the dot-dash line S3_2 and the dotted line S3_3 are all zero. This is true in the case where the atmospheric pressure change occurs.

When the collision of the vehicle occurs, the outer panel 52 is deformed, and thereby the door interior space 1 is deformed, like in the case of FIG. 3. As a result, the absolute pressure of the door interior space 1 is increased. In contrast, the absolute pressure of the passenger compartment 2 does not change substantially between before and after the collision of the vehicle. Therefore, right after the collision of the vehicle, the pressure difference sensed by the relative pressure sensor 10 is rapidly increased due to the increase in the absolute pressure of the door interior space 1.

Under different atmospheric pressures, a rate of change in the third signal S3 varies at the time of the collision of the vehicle. Specifically, the rate of change (a rate of increase) in the third signal S3 is increased when the atmospheric pressure is increased. Also, the rate of change (the rate of increase) in the third signal S3 is reduced when the atmospheric pressure is decreased. That is, as shown in FIG. 4, the rate of change in the solid line S3_1, which indicates the third signal S3 under the high atmospheric pressure, is relatively large, and the rate of change in the dotted line S3_3, which indicates the third signal S3 under the low atmospheric pressure, is relatively small.

Here, the absolute pressure of the passenger compartment 2 substantially corresponds to the atmospheric pressure. That is, when the atmospheric pressure changes, the absolute pressure of the passenger compartment 2 changes in response to the change in the atmospheric pressure. The threshold value map in the threshold value storage 33 stores the threshold values TH that are associated with the fourth signal S4, which varies in response to the absolute atmospheric pressure of the passenger compartment 2 sensed by the absolute pressure sensor 20. That is, the threshold map stored in the threshold value storage 33 stores the multiple threshold values TH, which correspond to various atmospheric pressures, respectively. For example, in the threshold value map, the threshold value TH in the case of the high atmospheric pressure is set to be TH1, and the threshold value TH in the case of the low atmospheric pressure is set to be TH3, and the threshold value TH in the case of the intermediate atmospheric pressure between the high atmospheric pressure and the low atmospheric pressure is set to be TH2. Therefore, as shown in FIG. 4, in the case of the high atmospheric pressure, the third signal S3 becomes one indicated by the solid line S3_1, and the threshold value TH compared with this signal is set to be TH1. That is, the comparator 35 determines whether the solid line S3_1 exceeds the threshold value TH1. When it is determined that the solid line S3_1 exceeds the threshold value TH1, the comparator 35 determines that the collision of the vehicle has occurred. In contrast, when the comparator 35 determines that the solid line S3_1 does not exceed the threshold value TH1, it is determined that the collision of the vehicle has not occurred. Furthermore, the dot-dash line S3_2 and the dotted line S3_3 are compared with the threshold value TH2 and the threshold value TH3, respectively, to determined the collision of the vehicle.

As described above, the pressure difference between the absolute pressure of the door interior space 1 and the absolute pressure of the passenger compartment 2 sensed by the relative pressure sensor 10 is substantially zero until just before the collision of the vehicle. This pressure difference does not change even when the atmospheric pressure changes. Thus, the collision of the vehicle is determined based on this pressure difference, which is substantially zero until just before the collision of the vehicle even at the time of occurrence of the change in the atmospheric pressure. Therefore, the collision of the vehicle can be determined without being influenced by the change in the atmospheric pressure.

Furthermore, when the atmospheric pressure changes, the rate of change in the pressure difference sensed by the relative pressure sensor 10 changes. However, the threshold value setting arrangement 34 sets the threshold value TH, which corresponds to the fourth signal that varies in response to a change in the absolute pressure of the passenger compartment 2 sensed by the absolute pressure sensor 20. The absolute pressure of the passenger compartment 2 corresponds to the atmospheric pressure. That is, the threshold value TH, which is compared with the third signal S3 that corresponds to the pressure difference, is changed and is set based on the atmospheric pressure. Thus, the collision of the vehicle can be reliably sensed.

Figure 5:
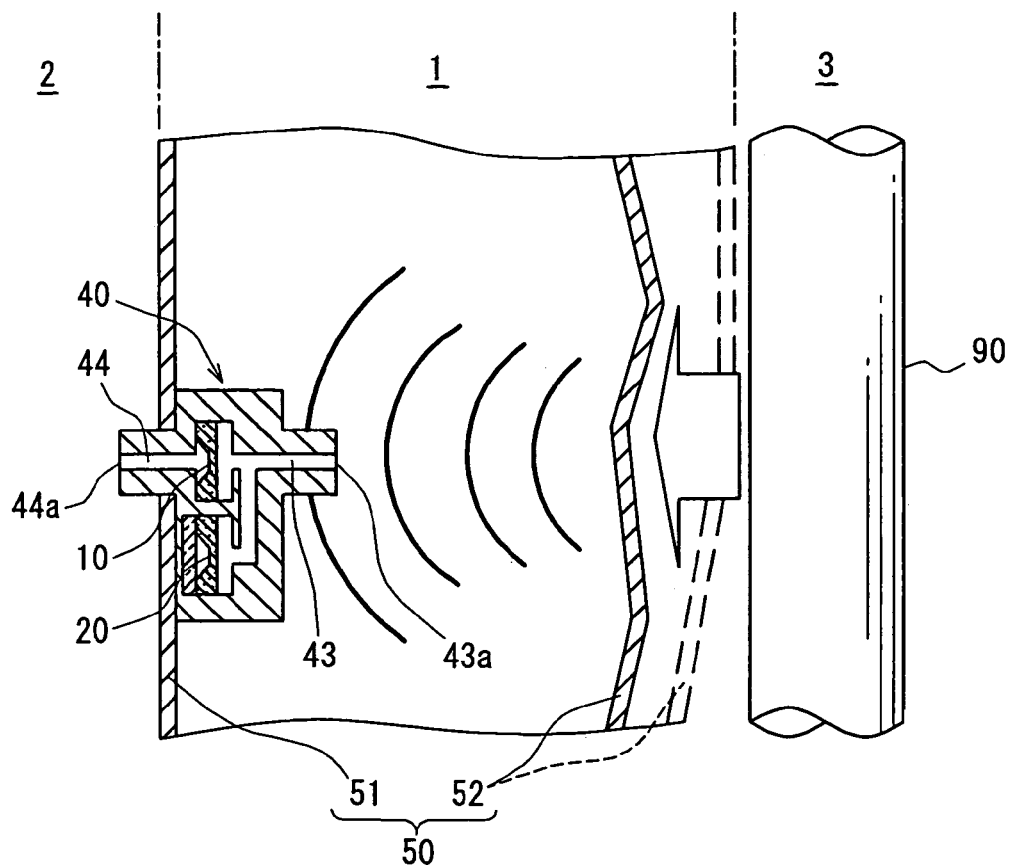
FIG. 5 is an enlarged view according to a first modification of the first embodiment similar to FIG. 3.

Next, a first modification of the vehicle collision sensing system of the first embodiment will be described with reference to FIG. 5. FIG. 5 is an enlarged view that is similar to FIG. 3 and shows the first modification. In the first modification of the first embodiment, the structure of the integral sensor module 40 and the second low-pass filter 32 of the A/B ECU 30 differ from those of the first embodiment. Differences between the first modification and the above embodiment will be described.

The differences are as follows. That is, in the first modification, the absolute pressure sensor 20 senses the absolute pressure of the door interior space 1, and the second cutoff frequency of the second low-pass filter 32 is made lower than that of the first embodiment. These points will be described in detail.

As shown in FIG. 5, the integral sensor module 40 is mostly arranged in the door interior space 1 that is formed between the inner panel 51 and the outer panel 52, which form the vehicle door 50. Further specifically, the integral sensor module 40 is installed to an outer panel 52 side surface of the inner panel 51.

As shown in FIG. 5, the integral sensor module 40 receives the relative pressure sensor 10 and the absolute pressure sensor 20, and two sensing holes, i.e., first and second sensing holes 43, 44 are formed in the integral sensor module 40. The first sensing hole 43 communicates between one side surface (a right side surface in FIG. 5) of the relative pressure sensor 10 and a door interior side sensing opening 43a, which opens in the door interior space 1. That is, the right side surface of the relative pressure sensor 10 of FIG. 5 receives the absolute pressure of the door interior space 1 from the door interior side sensing opening 43a through the first sensing hole 43. The first sensing hole 43 has a branch that is communicated with the absolute pressure sensor 20. That is, the absolute pressure sensor 20 receives the absolute pressure of the door interior space 1 from the door interior side sensing opening 43a through the first sensing hole 43. The second sensing hole 44 communicates between the other side surface (a left side surface in FIG. 5) of the relative pressure sensor 10 and a passenger compartment side sensing opening 44a, which opens in the passenger compartment 2. That is, the left side surface of the relative pressure sensor 10 of FIG. 5 receives the absolute pressure of the passenger compartment 2 from the passenger compartment side sensing opening 44a through the second sensing hole 44.

As described above, the absolute pressure sensor 20 senses the absolute pressure of the door interior space 1. Thus, the absolute pressure sensor 20 senses the absolute pressure of the door interior space 1, which is deformed in response to the collision of the vehicle. That is, the second signal S2, which is outputted from the absolute pressure sensor 20, rapidly changes due to the collision of the vehicle.

The second low-pass filter 32 performs low-pass filtering on the second signal S2, which is supplied from the absolute pressure sensor 20, at the second cutoff frequency, so that a fourth signal S4 is generated. The second cutoff frequency is set to be lower than the frequency of the absolute pressure of the door interior space 1, which rapidly changes at the time of the vehicle collision. The second signal S2, which is supplied to the second low-pass filter 32, corresponds to the absolute pressure of the door interior space 1, which rapidly changes due to the collision of the vehicle. Thus, the second signal S2 includes the frequency component of the absolute pressure of the door interior space 1, which rapidly changes due to the collision of the vehicle. In the second low-pass filter 32, the low-pass filtering is performed at the second cutoff frequency that is lower than the frequency of the absolute pressure of the door interior space 1, which rapidly changes due to the collision of the vehicle. Thus, the fourth signal 54 does not include the frequency component of the absolute pressure of the door interior space 1, which rapidly changes due to the collision of the vehicle. That is, the fourth signal 54 of the first modification is substantially the same as the fourth signal 54 of the first embodiment. In the threshold value setting arrangement 34, the threshold value TH is changed and is set in response to the fourth signal 54.

As discussed above, even in the case where the absolute pressure, which is measured by the absolute pressure sensor 20, is the absolute pressure of the door interior space 1, the collision of the vehicle can be reliably sensed.

Figure 6:
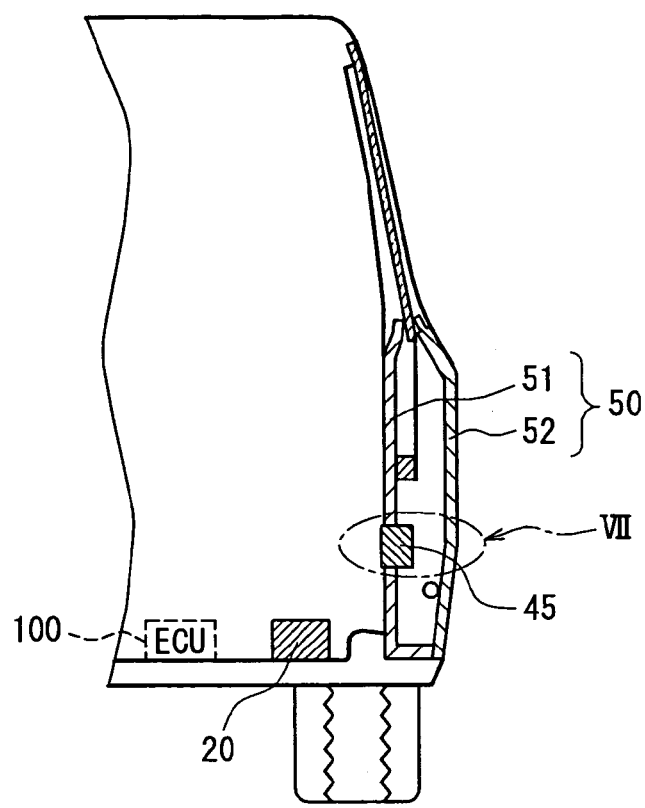
FIG. 6 is a cross sectional view of a vehicle door according to a second modification of the first embodiment.
Figure 7:
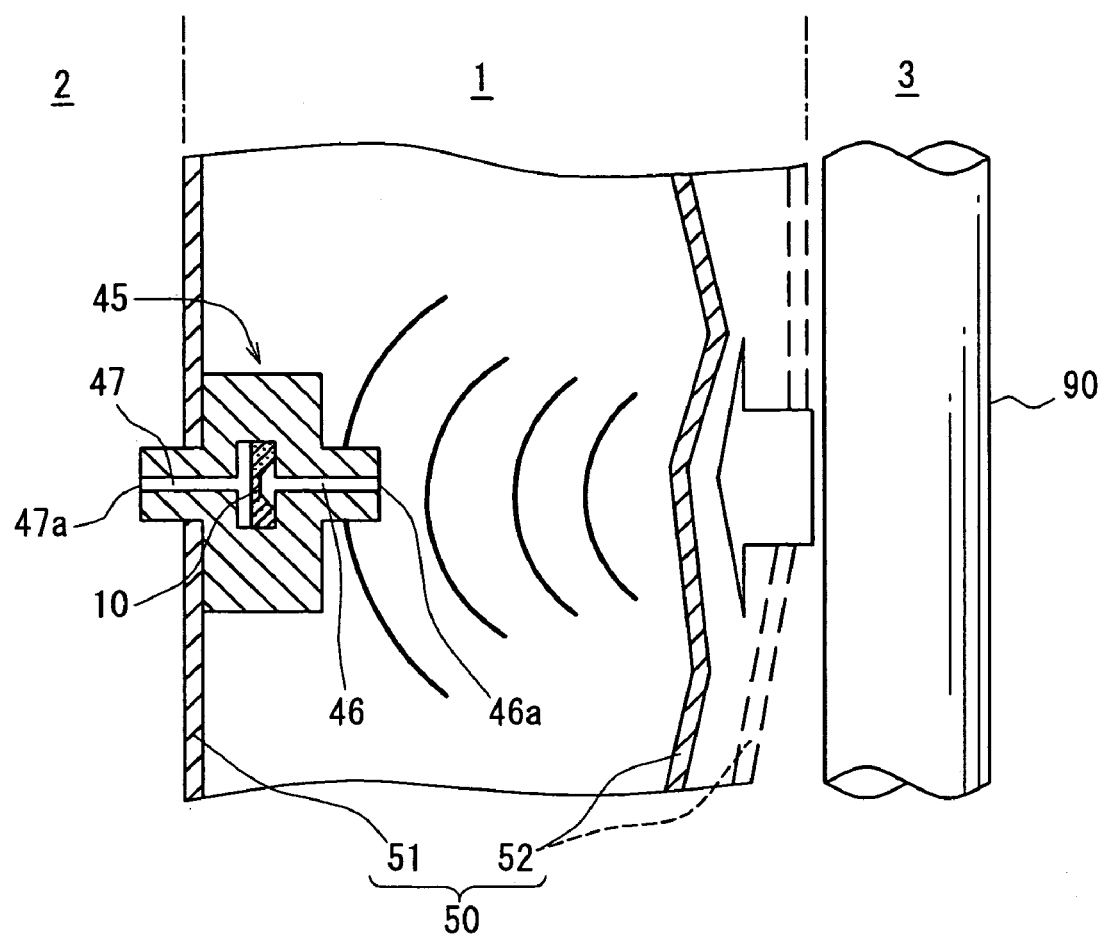
FIG. 7 is an enlarged view of a circled portion VII in FIG. 6.

Next, a second modification of the vehicle collision sensing system of the first embodiment will be described with reference to FIGS. 6 and 7. FIG. 6 is a cross sectional view of the vehicle door according to the second modification. FIG. 7 is an enlarged view of a circled portion VII in FIG. 6. The second modification differs from the first embodiment in the position of the relative pressure sensor 10 and the position of the absolute pressure sensor 20. Hereinafter, the second modification will be described only with respect to the differences relative to the first embodiment.

In the first embodiment, the relative pressure sensor 10 and the absolute pressure sensor 20 are integrally formed. Unlike the first embodiment, in the second modification, the relative pressure sensor 10 is formed separately from the absolute pressure sensor 20 and is placed in the different location, which is different from the location of the absolute pressure sensor 20.

Specifically, the relative pressure sensor 10 is received in the sensor module 45. As shown in FIGS. 6 and 7, this sensor module 45 is arranged in the door interior space 1 that is formed between the inner panel 51 and the outer panel 52, which form the vehicle door 50. Further specifically, the sensor module 45 is installed to an outer panel 52 side surface of the inner panel 51.

As shown in FIG. 7, the sensor module 45 receives the relative pressure sensor 10, and two sensing holes, i.e., first and second sensing holes 46, 47 are formed in the sensor module 45. The first sensing hole 46 communicates between one side surface (a right side surface in FIG. 7) of the relative pressure sensor 10 and a door interior side sensing opening 46a, which opens in the door interior space 1. That is, the right side surface of the relative pressure sensor 10 of FIG. 7 receives the absolute pressure of the door interior space 1 from the door interior side sensing opening 46a through the first sensing hole 46. The second sensing hole 47 communicates between the other side surface (a left side surface in FIG. 7) of the relative pressure sensor 10 and a passenger compartment side sensing opening 47a, which opens in the passenger compartment 2. That is, the left side surface of the relative pressure sensor 10 of FIG. 7 receives the absolute pressure of the passenger compartment 2 from the passenger compartment side sensing opening 47a through the second sensing hole 47. The absolute pressure sensor 20 is arranged on a floor of the passenger compartment 2. That is, the absolute pressure sensor 20 senses the absolute pressure of the passenger compartment 2, which does not change upon the collision of the vehicle. In this instance, the absolute pressure sensor 20 may be provided separately from the A/B ECU 30. Alternatively, the absolute pressure sensor 20 may be provided integrally with the A/B ECU 30. When the absolute pressure sensor 20 and the A/B ECU 30 are integrated, a signal line that connects between the absolute pressure sensor 20 and the A/B ECU 30 may be reduced to allow a reduction in a manufacturing cost.

Second Embodiment

Figure 9:
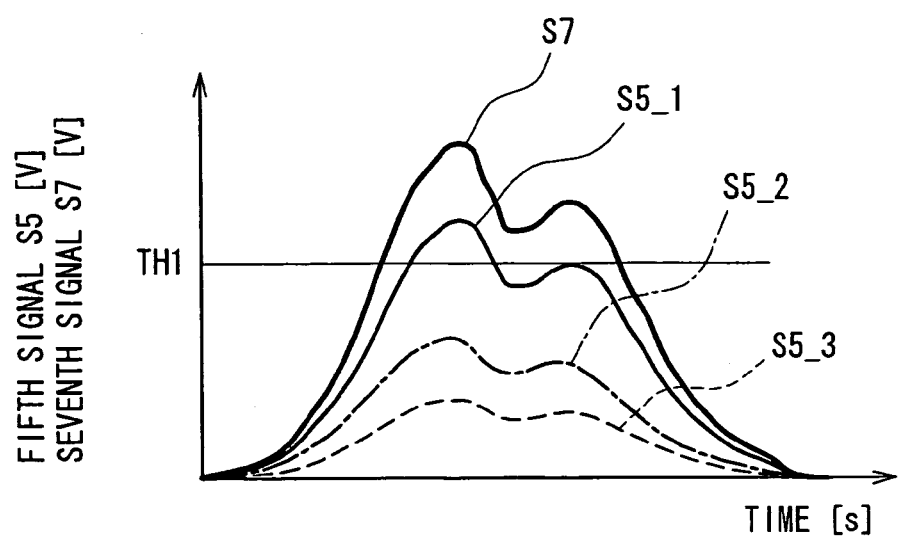
FIG. 9 is a diagram for describing a signal processing operation in a relative pressure sensor and for indicating a voltage of a fifth signal and a voltage of a seventh signal relative to the elapsed time since the collision of the vehicle.
Figure 8:
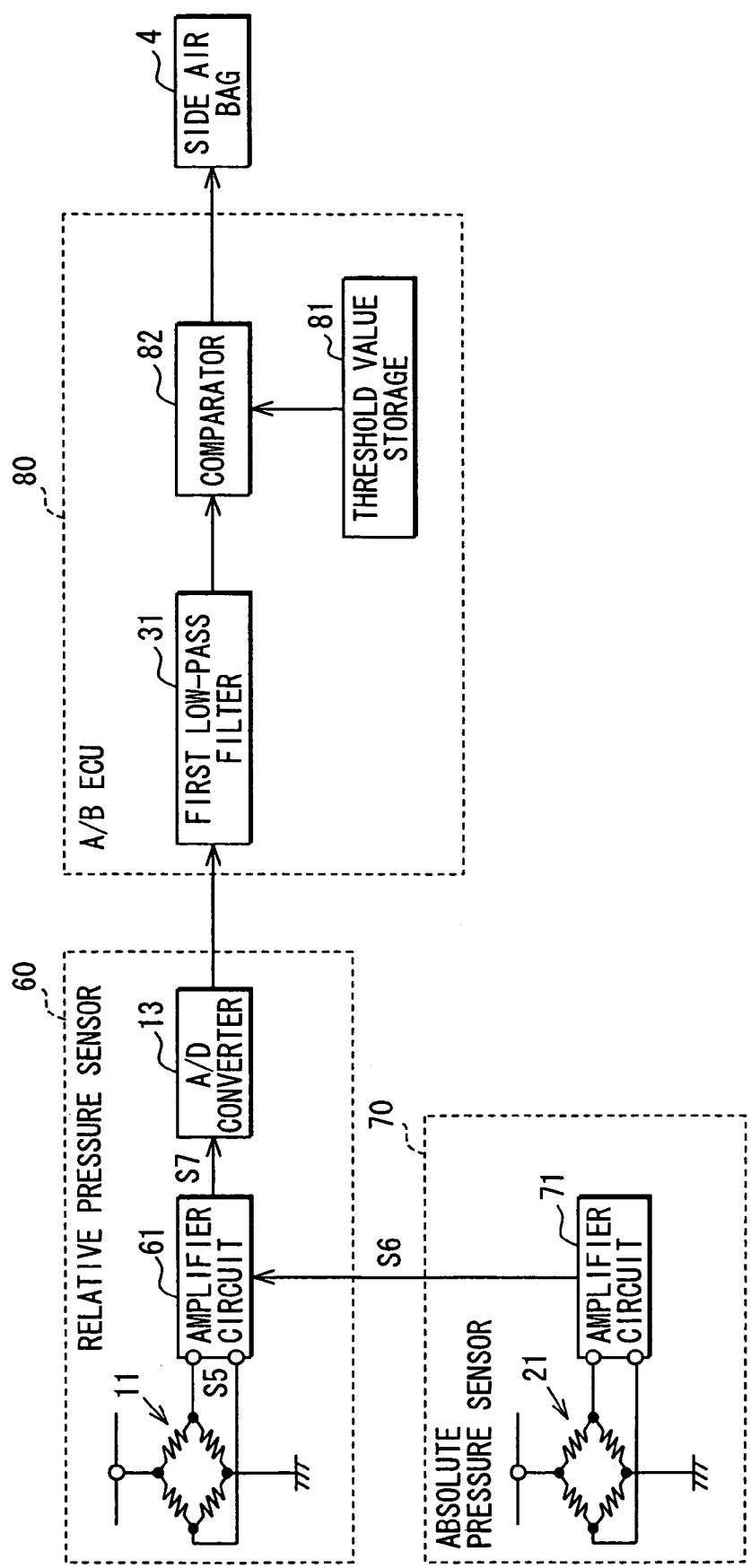
FIG. 8 is a block diagram showing a vehicle collision sensing system of a second embodiment.

Next, a vehicle collision sensing system according to a second embodiment will be described with reference to FIGS. 8 and 9. FIG. 8 is a block diagram showing the vehicle collision sensing system of the second embodiment. FIG. 9 is a diagram for describing a signal processing operation in a relative pressure sensor 60. In the second embodiment, components similar to those described in the first embodiment will be indicated by the same numerals and will not be described further.

As shown in FIG. 8, the vehicle collision sensing system of the second embodiment includes the relative pressure sensor 60, an absolute pressure sensor 70 and an A/B ECU 80. Similar to the relative pressure sensor 10 and the absolute pressure sensor 20 of the first embodiment, the relative pressure sensor 60 and the absolute pressure sensor 70 are received in the integral sensor module 40 and are provided to the outer panel 52 side surface of the inner panel 51. That is, the relative pressure sensor 60 receives the absolute pressure of the door interior space 1 and the absolute pressure of the passenger compartment 2. Furthermore, the absolute pressure sensor 70 receives the absolute pressure of the passenger compartment 2.

The relative pressure sensor 60 includes a relative pressure sensor chip 11, an amplifier circuit 61 and the A/D converter 13.

The relative pressure sensor chip 11 of the second embodiment is similar to the relative pressure sensor chip 11 of the first embodiment. That is, the relative pressure sensor chip 11 includes diffused resistors, which form a Wheatstone bridge on a diaphragm that is produced by thinly processing a center portion of a silicon chip. The relative pressure sensor chip 11 outputs a signal (a fifth signal) S5, which indicates the electric potential difference between the left end and the right end of the relative pressure sensor chip 11 of FIG. 8 corresponding to the pressure difference between the absolute pressure of the door interior space 1 and the absolute pressure of the passenger compartment 2.

The amplifier circuit 61 receives the fifth signal S5, which is outputted from the relative pressure sensor chip 11 and indicates the electric potential difference. Furthermore, the amplifier circuit 61 also receives a sixth signal S6, which is outputted from an amplifier circuit 71 of the absolute pressure sensor 70. The amplifier circuit 61 amplifies the fifth signal S5 in view of the sixth signal S6 and thereby generates a seventh signal S7. Specifically, in the amplifier circuit 61, as the voltage value of the sixth signal S6 gets larger, a degree of amplification becomes smaller. In contrast, as the voltage value of the sixth signal S6 gets smaller, the degree of amplification becomes larger. As will be described below in detail, the sixth signal S6 substantially corresponds to the atmospheric pressure. Therefore, when the atmospheric pressure gets higher, the degree of amplification in the amplifier circuit 61 becomes smaller. In contrast, when the atmospheric pressure gets lower, the degree of amplification in the amplifier circuit 61 becomes larger. A relationship between the fifth signal S5 and the seventh signal S7 will be described below. The seventh signal S7, which is amplified by the amplifier circuit 61, is A/D converted by the A/D converter 13 and is then supplied to the A/B ECU 80.

The absolute pressure sensor 70 includes the absolute pressure sensor chip 21 and the amplifier circuit 71. The absolute pressure sensor chip 21 is similar to the absolute pressure sensor chip 21 of the first embodiment. That is, the absolute pressure sensor chip 21 includes diffused resistors, which form a Wheatstone bridge on a diaphragm that is produced by thinly processing a center portion of a silicon chip. The absolute pressure sensor chip 21 outputs a signal, which indicates the electric potential difference between the left end and the right end of the absolute pressure sensor chip 21 in FIG. 8 and corresponds to the absolute pressure of the passenger compartment 2. Here, the absolute pressure of the passenger compartment 2 substantially corresponds to the atmospheric pressure.

The amplifier circuit 71 amplifies the signal of the absolute pressure outputted from the absolute pressure sensor chip 21 and thereby generates the sixth signal S6. The amplifier circuit 71 outputs the amplified sixth signal S6 to the amplifier circuit 61 of the relative pressure sensor 60.

The amplification by the amplifier circuit 61 of the pressure sensor 60 will be described with reference to FIG. 9. FIG. 9 is a diagram showing the voltage of the fifth signal S5 and the voltage of the seventh signal S7 relative to the elapsed time since the collision of the vehicle. In FIG. 8, a fine solid line S5_1, a fine dot-dash line S5_2 and a fine dotted line S5_3 indicate a change in the fifth signal S5 for three different atmospheric pressures, respectively, at the time of applying the same impact to the vehicle. Specifically, the fine solid line S5_1 indicates a state under a high atmospheric pressure. The fine dotted line S5_3 indicates a state under a low atmospheric pressure. The fine dot-dash line S5_2 indicates a state under an intermediate atmospheric pressure, which is intermediate between the high atmospheric pressure and the low atmospheric pressure. A bold solid line S7 indicates the behavior (change) of the seventh signal S7, which is generated by amplifying the fifth signals S5_1 to S5_3.

The change in the fifth signal S5 in FIG. 9 in response to the atmospheric pressure occurs because of the reasons similar to those discussed with reference to FIG. 4 and therefore will not be described any further. In brief, the fifth signal S5 is zero until just before the collision of the vehicle even when the atmospheric pressure varies, and the rate of change in the fifth signal S5 right after the collision of the vehicle varies depending on the atmospheric pressure.

In contrast, the seventh signal S7 shows the same change regardless of the atmospheric pressure as long as the vehicle receives the same impact. This is due to the fact that the degree of amplification in the amplifier circuit 61 changes in response to the sixth signal S6 outputted from the amplifier circuit 71 of the absolute pressure sensor 70. Specifically, as the voltage of the sixth signal S6 gets larger, the degree of amplification in the amplifier circuit 61 becomes smaller. In contrast, as the voltage of the sixth signal S6 gets smaller, the degree of amplification in the amplifier circuit 61 becomes larger. As described above, the sixth signal S6 substantially corresponds to the atmospheric pressure. Therefore, when the atmospheric pressure gets higher, the degree of amplification in the amplifier circuit 61 becomes smaller. In contrast, when the atmospheric pressure gets lower, the degree of amplification in the amplifier circuit 61 becomes larger. In the case where the same impact is applied to the vehicle, the seventh signal S7 is amplified in such a manner that the seventh signal S7 shows the same behavior (change) regardless of the atmospheric pressure.

Now, the description is made with reference to FIG. 8. The A/B ECU 80 determines whether the side air bag 4 should be deployed based on the seventh signal S7 received from the relative pressure sensor 60. The A/B ECU 80 includes the first low-pass filter 31, a threshold value storage 81 and a comparator 82.

The first low-pass filter 31 performs low-pass filtering on the signal, which is supplied from the relative pressure sensor 60, at a first cutoff frequency. Here, the first cutoff frequency is set to be higher than the frequency of the pressure difference between the absolute pressure of the door interior space 1 and the absolute pressure of the passenger compartment 2 at the time of the vehicle collision. Furthermore, the first cutoff frequency is set to be lower than the frequency of the high frequency noises to remove the high frequency noises.

The threshold value storage 81 stores a threshold value TH, which is used to determine the collisions of the vehicle. The threshold value TH serves as a reference value that is compared with the signal, which is generated by the first low-pass filter 31, to determine the collision of the vehicle.

The comparator (the collision determining means) 82 compares the signal generated by the first low-pass filter 31 with the threshold value TH stored in the threshold value storage 81. When it is determined that the signal generated by the first low-pass filter 31 exceeds the threshold value TH, the comparator 82 determines that a collision of the vehicle has occurred. When it is determined that the collision of the vehicle has occurred, the comparator 82 outputs a signal for deploying the side air bag 4.

In the comparator 82 of the second embodiment, the signal, which is generated by the first low-pass filter 31, is compared with the signal, threshold value TH to determine the collision of the vehicle. Here, as described above, even in the various cases where the atmospheric pressure is different from one another, the signal outputted from the relative pressure sensor 60 shows generally the same behavior (change) as long as the same impact is applied to the vehicle. Thus, regardless of the atmospheric pressure, the collision of the vehicle can be reliably sensed by comparing the signal generated from the first low pass filter 31 with the threshold value TH.

Now, a modification of the second embodiment will be described. In the second embodiment, the absolute pressure sensor 70 is arranged to senses the absolute pressure of the passenger compartment 2. Alternatively, the absolute pressure sensor 70 may sense the absolute pressure of the door interior space 1. However, in such a case, the absolute pressure of the door interior space 1 rapidly changes due to the collision of the vehicle. Thus, the low-pass filtering should be performed thorough use of the cutoff frequency, which is lower than the frequency of the absolute pressure of the door interior space 1 that rapidly changes due to the collision of the vehicle. In this way, the signal, which is generated upon execution of the low-pass filtering on the absolute pressure of the door interior space 1, becomes substantially similar to the signal that corresponds to the absolute pressure of the passenger compartment 2.

Now, other modifications of the above embodiments will be described. In the above embodiments, the signal, which is generated by the absolute pressure sensor 20, 70, is outputted to the A/B ECU 30 or the relative pressure sensor 60. However, the present invention is not limited to this. For example, the signal, which is generated by the absolute pressure sensor 20, 70, may be outputted to a control apparatus of any other system other than the vehicle collision sensing system, such as a control apparatus that controls a fuel injection quantity in an internal combustion engine of the vehicle. However, it should be noted that the absolute pressure sensor 20, 70 is desirably a sensor, which can sense an absolute pressure that is not likely influenced by the collision of the vehicle. For example, the absolute pressure sensor 20, 70 may sense the absolute pressure of the passenger compartment 2. More specifically, the signal, which is generated by the absolute pressure sensor 20 of FIG. 6 provided in the passenger compartment 2, may be supplied to a fuel injection control ECU 100 of FIG. 6 to control the fuel injection of the engine.

Furthermore, in the above embodiment, the absolute pressure of the door interior space 1 of the vehicle door 50 is supplied to the relative pressure sensor 10, 60 of the above embodiments and the absolute pressure sensor 20 of the first modification of the first embodiment. However, the present invention is not limited to this. For example, these sensors 10, 20, 60 may receive a pressure of any other appropriate space, which is deformed by the collision of the vehicle. That is, these sensors 10, 20, 60 may receive the pressure of the space, in which the absolute pressure of the space changes due to the collision of the vehicle.

Furthermore, in each of the above embodiments, the relative pressure sensor 10, 60 and the absolute pressure sensor 20, 70 are used. Alternatively, only the relative pressure sensor may be used without the absolute pressure sensor. However, in such a case, it is not possible to correspond to a change in the rate of change in the pressure difference in response to the atmospheric pressure.

Furthermore, in the above embodiment, the threshold map is stored in the threshold value storage 33, and the corresponding threshold value TH is selected by the threshold value setting arrangement 34. However, the present invention is not limited to this. For example, the threshold value storage 33 and the threshold value setting arrangement 34 may be replaced with a threshold value computing arrangement. For example, the threshold value computing arrangement may compute the threshold value TH based on a corresponding relational expression, which changes the threshold value TH proportional to the signal received from the absolute pressure sensor 20.

Additional advantages and modifications will readily occur to those skilled in the art. The invention in its broader terms is therefore not limited to the above specific details and illustrative examples.

What is claimed is:

1. A vehicle collision sensing system for sensing a collision of a vehicle, comprising:
   a vehicle body member, which forms a predetermined space therein, wherein the predetermined space is deformable by the collision of the vehicle;
   relative pressure sensing means for sensing a pressure difference between a pressure at an inside of the predetermined space and a pressure at an outside of the predetermined space;
   collision determining means for determining the collision of the vehicle based on the pressure difference, which is sensed by the relative pressure sensing means; and
   absolute pressure sensing means for sensing an absolute pressure at the inside or the outside of the predetermined space, wherein the collision determining means determines the collision of the vehicle based on:
   the pressure difference that is sensed by the relative pressure sensing means; and
   the absolute pressure that is sensed by the absolute pressure sensing means.

2. The vehicle collision sensing system according to claim 1, wherein the collision determining means includes:
   comparing means for comparing the pressure difference, which is sensed by the relative pressure sensing means, with a predetermined threshold value to determine the collision; and
   threshold value setting means for changing and setting the threshold value based on the absolute pressure, which is sensed by the absolute pressure sensing means.

3. The vehicle collision sensing system according to claim 1, wherein:
   the relative pressure sensing means includes:
      a sensing circuit that outputs a pressure difference indicative signal, which corresponds to the pressure difference; and
      an amplifier circuit that amplifies the pressure difference indicative signal received from the sensing circuit by a predetermined degree of amplification and thereby generates an amplified signal;
   the amplifier circuit changes the degree of amplification based on the absolute pressure, which is sensed by the absolute pressure sensing means; and
   the collision determining means determines the collision based on the amplified signal, which is amplified by the amplifier circuit.

4. The vehicle collision sensing system according to claim 1, wherein:
   the relative pressure sensing means outputs a pressure difference indicative signal based on the pressure difference;
   the absolute pressure sensing means outputs an absolute pressure indicative signal that corresponds to the absolute pressure at the inside of the predetermined space;
   the vehicle collision sensing system further comprises:
      a first low-pass filter that performs low-pass filtering on the pressure difference indicative signal received from the relative pressure sensing means at a first cutoff frequency and thereby generates a first filtered signal; and
      a second low-pass filter that performs low-pass filtering on the absolute pressure indicative signal received from the absolute pressure sensing means at a second cutoff frequency lower than the first cutoff frequency and thereby generates a second filtered signal; and
   the collision determining means determines the collision based on the first filtered signal and the second filtered signal.

5. The vehicle collision sensing system according to claim 1, wherein the relative pressure sensing means and the absolute pressure sensing means are formed integrally.

6. The vehicle collision sensing system according to claim 5, wherein:
   the relative pressure sensing means includes a sensing opening, from which the pressure at the outside of the predetermined space is supplied into the relative pressure sensing means; and
   the absolute pressure sensing means receives the absolute pressure at the outside of the predetermined space from the sensing opening.

7. The vehicle collision sensing system according to claim 5, wherein:
   the relative pressure sensing means includes a sensing opening, from which the pressure at the inside of the predetermined space is supplied into the relative pressure sensing means; and
   the absolute pressure sensing means receives the absolute pressure at the inside of the predetermined space from the sensing opening.

8. The vehicle collision sensing system according to claim 1, wherein the absolute pressure sensing means is positioned at the outside of the predetermined space and senses the absolute pressure at the outside of the predetermined space.

9. The vehicle collision sensing system according to claim 8, wherein the absolute pressure sensing means outputs the sensed absolute pressure to a control means other than the collision determining means.

10. A vehicle collision sensing system for sensing a collision of a vehicle, comprising:
    a vehicle body member, which forms a predetermined space therein, wherein the predetermined space is deformable by the collision of the vehicle, and the vehicle body member is a vehicle door;
    relative pressure sensing means for sensing a pressure difference between a pressure at an inside of the predetermined space and a pressure at an outside of the predetermined space; and collision determining means for determining the collision of the vehicle based on the pressure difference, which is sensed by the relative pressure sensing means.

11. The vehicle collision sensing system according to claim 10, wherein:
the relative pressure sensing means is installed to a door inner panel of the vehicle door;
the predetermined space is a door interior space of the vehicle door; and
the outside of the predetermined space is an inside of a vehicle passenger compartment, which is located on a vehicle interior side of the door inner panel.

12. The vehicle collision sensing system according to claim 10, wherein the relative pressure sensing means is in direct communication with the inside of the predetermined space and the outside of the predetermined space.

* * * * *